United States Patent [19]
Yuo et al.

[11] Patent Number: 5,264,406
[45] Date of Patent: Nov. 23, 1993

[54] CATALYST SYSTEM FOR POLYAMIDE AND COPOLYAMIDE

[75] Inventors: Wu-Bin Yuo; Wen-Jer Chen; Jeng-Yue Wu; Mao-Song Lee, all of Hsinchu, Taiwan

[73] Assignee: Industrial Technology Research Institute, Hsinchu, Taiwan

[21] Appl. No.: 948,130

[22] Filed: Sep. 18, 1992

[51] Int. Cl.⁵ .................. B01J 27/18; B01J 31/02; B01J 27/24
[52] U.S. Cl. ............................ 502/167; 502/162
[58] Field of Search ..................... 502/162, 167

[56] References Cited
FOREIGN PATENT DOCUMENTS

| 0963594 | 2/1975 | Canada . |
| 62-027430 | 2/1987 | Japan . |
| 63-196625 | 8/1988 | Japan . |
| 63-268738 | 11/1988 | Japan . |

OTHER PUBLICATIONS

*Concise Science Dictionary*, Oxford University Press, Oxford, England, 1984, p. 665.

*Primary Examiner*—W. J. Shine
*Assistant Examiner*—Douglas J. McGinty
*Attorney, Agent, or Firm*—W. Wayne Liauh

[57] ABSTRACT

A catalyst composition for the polymerization of polyamide/copolyamide comprising a primary catalyst which comprises an alkali metal hypophosphite or an alkali-earth metal hypophosphite, and a cocatalyst which comprises an amine compound. The cocatalyst amine compound is selected from the group consisting of phenylene diamines, hindered amines, poly(hindered amines), and benzotriazoles. The catalyst composition of this invention is most useful when used in conjunction with the reactive extrusion technology which requires a very fast polymerization rate to take full advantage of this evolving technology.

14 Claims, No Drawings

CATALYST SYSTEM FOR POLYAMIDE AND COPOLYAMIDE

BACKGROUND OF THE PRESENT INVENTION

The present invention relates to a catalyst composition for the production of polyamide/copolyamide which comprises an alkali metal hypophosphite and an amine compound. More particularly, the present invention relates to a catalyst composition comprising an alkali metal hypophosphite as the primary catalyst and an amine compound as a cocatalyst, to increase the reaction rate during the polymerization of polyamide and/or copolyamide. In this disclosure, an amine compound is broadly defined as one of a class of organic nitrogen-containing compounds which can be considered to be derived from ammonia by replacement of one or more hydrogens by organic radicals.

Polyamide and copolyamide have been widely used as fibers and engineering plastics. In its application as engineering plastics, polyamide and copolyamide are mainly used to make automobile parts, electric and electronic components, electric wire coatings, tool boxes, and coasters. As fibers, polyamide and copolyamide are used in making fishing nets, carpets, tires and brushes (including toothbrushes, cosmetic brushes and grinding brushes) as well as stockings.

Polyamide/copolyamide can be synthesized using the conventional continuous reaction process, or the reactive extrusion process, which was developed only recently. In reactive extrusion process to synthesize polymers, the extruder is used as a mini-reactor. First, monomers, co-monomers and/or prepolymers are fed into the extruder. The reactants react inside the extruder to produce the polymer material, which is then extruded from the extruder to provide the final product.

The reactive extrusion technology has the following advantages: First, it provides a high area-to-volume ratio for excellent heat transfer. Second, it provides excellent mixing action during the polymerization reaction. This is particularly advantageous for highly viscous fluids, which can also be transported through the reactor. Third, it can be adapted to provide multiple temperature zones, each having a distinct temperature. Fourth, the reactive extruder can be adapted to provide multiple exhaust or vacuum sections, each vacuum section can have the same or different of vacuum. Fifth, it involves a continuous reaction-extrusion process. Sixth, the resident time involved in the process is very short; therefore, the productivity can be very high per unit time. Seventh, the reactive extrusion process requires a much simpler apparatus than most other conventional commercial reactors. Finally, with the reactive extrusion process, the composition of the feed monomers can be conveniently varied; this greatly enhances the utilization efficiency of the capital investment, and is particularly advantageous for production lines that make relatively small quantities of a large variety of products.

With the above mentioned advantages, the reactive extrusion technology potentially can become one of the best methods to produce polymers and copolymers. However, when the reactive extrusion technology is applied to the production of polyamide or copolyamide, current catalyst systems do not provide fast enough reaction rate to take full advantage of this evolving technology. The reaction must be very fast so that the polymerization reaction to make polyamide or copolyamide can be completed in the extruder before they are extruded.

PRIOR ART

Sodium hypophosphite has been widely used as a catalyst during the polymerization of polyamide. For example, Japanese Pat. App. JP 78-62205 discloses a method to make polyamide using sodium hypophosphite as catalyst. Japanese Pat. App. JP 89-179534 discloses the manufacturing of polyamides containing hexamethyleneterephthalamide units using sodium hypophosphite as catalyst. Japanese Pat. App. JP 89-263892 discloses aromatic copolyamides prepared in the presence of sodium hypophosphite.

Polymerization additives containing other than sodium hypophosphite have also been reported. Japanese Pat. App. JP 89-70404 discloses the use of sodium hypophosphite and MeOH during the polymerization of high-molecular weight hexamethylene-terephthalamide polymers. In Japanese Pat. App. 87-28152, now Japanese Pat. 63-196,625, the additives further contain alkylenediamine and monocarboxylic acids or primary or secondary monoamines. Canadian Pat. No. 963594 discloses heat-stable nylon 66 fibers with improved dyeability by adding sodium hypophosphite and diphenylamine into the nylon salt solution before polymerization reaction. Japanese Pat. App. JP 89-191926 discloses polyamide compositions with good resistance to flame and heat. Alkaline earth metal hypophosphites are used as catalyst in the polymerization reaction. U.S. Pat. No. 4,113,708 discloses a method using phenylphosphinic acid to reduce the formation of ammonia during the melt preparation of polyamide. Ger. Offen. DE 2158014 discloses a method to stabilize nylon 66 by adding alkali metal hypophosphite into amides and adipate before polymerization. Japanese Pat. Apps. JP 89-179,534 and JP 90-111015 disclose a method for the manufacturing of polyamides by first polymerizing diacids with diamine in the presence of a hypophosphite to give an oligomer then melt polymerizing the oligomer in the presence of a polyethylene was. Great Britain Pat. App. GB 6648485 discloses a heat and light stabilizing additive for polyamide by adding sodium hypophosphite and phenols containing at least one hydrocarbon radical and a radical containing a COOH group or a derivative, to polyamide after or during polycondensation. In Japanese Pat. App. JP 89-212160, the polymerization additives contain manganese hypophosphite, hexamethylenediamine, and triazine compounds, which are added to reactants as fire retardants.

Hypophosphites have also been used as additives to modify the properties of polyamide and/or copolyamide after the completion of the polymerization reaction. U.S. Pat. No. 2,510,777 teaches a modified polyamide having improved stability at elevated temperatures by incorporating into the polyamide a minor amount by weight of hypophosphorous compound. Eur. Pat. App. EP 90-101760 discloses polyamide compositions with improved oxidative stability; the additives disclosed therein including a low-temperature antioxidant from a halogenated hydroxyl ammonium compound, hydrosulfide, bisulfite, phosphorus, and phosphate and a reducing agent from metal hypophosphite and ammonium hypophosphite. Ger. Offen. DE 3636023 discloses a granulated thermoplastics for hot-melt adhesives by mixing copolyamides with refined paraffin and sodium hypophosphite. Japanese Pat. App. JP 85-198900 discloses a polyamide resin composition by blending polyamides with modified polyolefin resins and metal salts of $H_3PO_4$, $H_3PO_3$ and $H_3PO_2$, Japanese Pat. App. JP 81-34897 discloses a method for surface-sensitizing polyamide with sodium hydroxide and sodium hypophosphite. Japanese Pat. App. JP 78-97229 discloses using sodium hypophosphite as a heat stabilizer for copolyamide. Belg. BE 875530 discloses nonflammable polyester, polyamide and polyester-polyamide compositions by mixing polymers or copolymers with phosphinate salts. Japanese Pat. App. JP 90-208135 discloses a polyhexamethyleneadipamide with restricted three-dimensional structure. Copper acetate, potassium iodide or sodium hypophosphite is added to the final polymerized product as stabilizers. Japanese Pat. App. JP 90-116874 discloses mixing of sodium hypophosphite or calcium acid hypophosphite with polyamide, to prevent discolorization. Japanese Pat. App. JP 88-331806 discloses the use of hypophospherous acid or hypophosphite as anti-coloring agent for polyamide fillers. Japanese Pat. App. JP 88-273373 discloses an injection moulded aliphatic polyamide container comprising a polyamide and additives selected from orthophosphorous acid, hypophosphorous acid, alkali metal salts and alkaline salts. Eur. Pat. App. EP 88-305493 discloses a method by which sodium hypophosphite and a cross-linking agent are added to a linear aliphatic polyamide to improve its melt viscosity.

Examples of prior art literature disclosing the use of reactive extruders include U.S. Pat. No. 4,603,166 which teaches a crystalline polyamide composition prepared from aliphatic diamines and either mixtures of terephathalic acid and adipic acid or mixtures of terephathalic acid, isophthalic acid and adipic acid. Sodium hypophosphite was used as catalyst. Ger. Offen. DE 3605202 discloses a method for making high viscosity polyamide using a twin screw extruder. A prepolymer melt is made to travel through zones of elevated and reduced pressure which undergoes polycondensation in the extruder. In the high pressure zones, the melt is exposed to superheated steam and in the reduced pressure zones, condensation water and steam are removed from the melt.

SUMMARY OF THE PRESENT INVENTION

The main object of the present invention is to provide catalyst compositions comprising alkali metal or alkaline earth hypophosphites as primary catalyst and an amine compound as cocatalysts so that the reaction rate associated with the polymerization of polyamide and copolyamide can be increased over those using prior art catalysts.

The present invention discloses catalyst compositions comprising hypophosphites of alkali metals as primary catalyst and an amine compound as cocatalyst to increase the polymerization rate of polyamide and co-polyamide. Polyamides are the products of a diacid and a diamine. Copolyamides are the products of a diamine and at least two diacids.

The present invention discloses using amines as novel cocatalysts which can be selected from following groups.

1. Phenylene diamine derivatives having the following general structure:

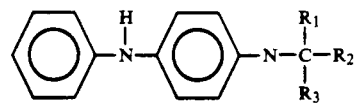

wherein $R_1$, $R_2$ and $R_3$ can be hydrogen or aliphatic groups having 1 to 10 carbons, preferably hydrogen or aliphatic group having 1 to 6 carbons. Examples of these compounds include: N-phenyl-N'-isopropyl-P-phenylene diamine, N-phenyl-N'-(1,3-dimethylbutyl)-p-phenylenediamine, N-phenyl-N'-methyl-p-phenylenediamine, N-phenyl-N'-tert-butyl-p-phenylene diamine, N-phenyl-N'-ethyl-p-phenylene diamine, N-phenyl-N'-octyl-p-phenylene diamine, N-phenyl-N'-decyl-p-phenylene diamine, N-phenyl-N'-isoctyl-p-phenylene diamine, N-phenyl-N'-isodecyl-p-phenylene diamine, N-phenyl-N'-isobutyl-p-phenylene diamine, N-phenyl-N'-(1,4-dimethyl hexyl)-p-phenylene diamine, N-phenyl-N'-(1,4-diethyl hexyl)-p-phenylene diamine, N-phenyl-N'-(1,3-diethyl-butyl)-p-phenylene diamine, and N-phenyl-N'-(1,5-dimethyl-hexyl)-p-phenylene diamine.

2. Hindered amine derivatives having the following general structure:

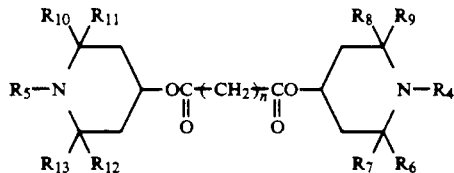

wherein n ranges from 1 to 18, preferably from 2 to 10. $R_4$ through $R_{13}$ can be hydrogen or aliphatic groups having 1 to 10 carbons, preferably hydrogen or aliphatic groups having 1 to 6 carbons. Examples of these compounds include: Bis (1,2,2,6,6-pentamethyl-4-piperidyl)sebacate, Bis(2,2,6,6,-tetramethyl-4-piperidyl)sebacate, Bis(2,6-dimethyl-2,6-di-tert-butyl-4-piperidyl) sebacate, Bis (1,2,6-trimethyl-2,6-di-tert-butyl-4-piperidyl) sebacate, Bis (1,2,2,6,6-penta-tert-butyl-4-piperidyl) sebacate, Bis (2,2,6,6-tetra-tert-butyl-4-piperidyl) sebacate, Bis (1,2,2,6,6-penta-methyl-4-piperidyl) adipate, Bis (2,2,6,6-tetra-methyl-4-piperidyl)adipate, Bis(1,2,2,6,6-penta-tert-butyl-4-piperidyl)adipate, Bis(1,2,6-trimethyl-2,6-di-tert-butyl-4-piperidyl) adipate, Bis (2,6-dimethyl-2,6-di-tert-butyl-4-piperidyl) adipate, Bis (2,2,6,6-tetramethyl-4-piperidyl) succinate, Bis(1,2,2,6,6-pentamethyl-4-piperidyl) succinate, Bis(1,2,6-trimethyl-2,6-di-tert-butyl-4-piperidyl) adipate, and Bis(1,2,6-trimethyl-2,6-di-tert-butyl-4-piperidyl) sebacate.

3. Poly(hindered amine) derivatives having the following general structure:

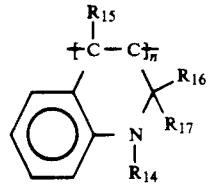

wherein $R_{14}$ through $R_{17}$ are hydrogen or aliphatic groups having 1 to 10 carbons, preferably hydrogen or aliphatic groups having 1 to 6 carbons. Examples of these compounds include: Poly(2,2,4-trimethyl-1,2-dihydroquinoline), Poly(2,2-dimethyl-1,2-dihydroquinoline), Poly(2,4-dimethyl-1,2-dihydroquinoline), Poly(1,2,2,4-tetramethyl-1-1,2-dihydroquinoline), Poly(1,2,4-trimethyl-1,2-dihydroquinoline), Poly(1-methyl-1,2-dihydroquinoline), Poly(2,2-dimethyl-4-tert-butyl-1,2-dihydroquinoline), and Poly (1-tert-butyl-2,2-dimethyl-1,2-dihydroquinoline).

4. Group I benzotriazole having the following general structure:

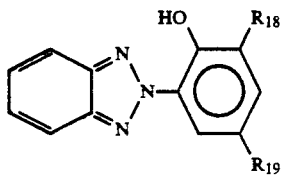

wherein $R_{18}$ and $R_{19}$ are hydrogen or aliphatic groups having 1 to 10 carbons, preferably hydrogen or aliphatic groups having 1 to 6 carbons. Examples of these compounds include: 2-(2-hydroxyl-3-methyl-phenyl)-2H-benzotriazole, 2-(2-hydroxyl-phenyl)-2H-benzotriazole, 2-(2-hydroxyl-5-methyl-phenyl)-2H-benzotriazole, 2-(2-hydroxyl-3,5-dimethyl-phenyl)-2H-benzotriazole,2-(2-hydroxyl-3,5-diisopropyl-phenyl)-2H-benzotriazole,2-(2-hydroxyl-3,5-di-tert-butyl-phenyl)-2H-benzotriazole,2-(2-hydroxyl-3-methyl-5-tert-butyl-phenyl)-2H-benzotriazole, 2-(2-hydroxyl-3,5-diisobutyl-phenyl)-2H-benzotriazole, 2-(2-hydroxyl-3-isopropyl-5-tert-butyl-phenyl)-2H-benzotriazole, 2-(2-hydroxyl-3-tert-butyl-5-isopropyl-phenyl)-2H-benzotriazole, and 2-(2-hydroxyl-3-methyl-5-isopropyl-phenyl)-2H-benzotriazole.

5. Group II benzotriazole having the following general structure:

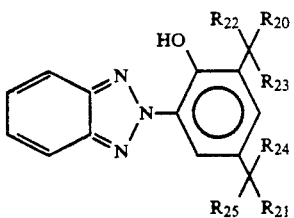

wherein $R_{20}$ and $R_{21}$ are benzene, naphthalene or their derivatives, preferably benzene or derivatives of benzene. $R_{22}$ through $R_{25}$ are hydrogen or aliphatic groups having 1 to 10 carbons, preferably hydrogen or aliphatic groups having 1 to 6 carbons. Examples of these compounds include: 2-[2-hydroxyl-3,5-di-(1,1-dimethyl-benzyl) phenyl]-2H-benzotriazole, 2-[2-hydroxyl-3,5-di-(1-methyl-benzyl) phenyl]-2H-benzotriazole, 2-[2-hydroxyl-3,5-dibenzyl-phenyl]-2H-benzotriazole, 2-[2-hydroxyl-3,5-di-(1,1-diisopropyl-benzyl)-phenyl]-2H-benzotriazole, 2-[2-hydroxyl-3,5-di-(1-isopropyl-benzyl)-phenyl]-2H-benzotriazole, 2-[2-hydroxyl-3,5-di(1,1-di-tert-butyl-benzyl)-phenyl]-2H-benzotriazole, 2-(2-hydroxyl-3-(1,1-di-tert-butyl-benzyl)-5-(1,1-diisopropyl-benzyl)-phenyl]-2H-benzotriazole, 2-[2-hydroxyl-3-(1,1-diisopropyl-benzyl)-5-(1,1-di-tert-butyl-benzyl)-phenyl]-2H-benzotriazole, 2-[2-hydroxyl-3-benzyl-5-(1,1-di-tert-butyl-benzyl)-phenyl]-2H-benzotriazole, 2-[2-hydroxyl-3-(1,1-di-tert-butyl-benzyl)-5-benzyl-phenyl]-2H-benzotriazole, 2-[2-hydroxyl-3-(1-methyl-benzyl)-5-benzyl-phenyl]-2H-benzotriazole, 2-[2-hydroxyl-3-(1-tert-butyl-benzyl)-5-benzyl-phenyl]-2H-benzotriazole, and 2-[2-hydroxyl-3-(1-isopropyl-benzyl)-5-benzyl-phenyl]-2H-benzotriazole.

The polyamides and copolyamides disclosed in the present invention are synthesized from diacids and diamines. The diacids include aliphatic diacids and aromatic diacids, wherein the aliphatic diacids have the following general structure:

$$HOOC(CH_2)_nCOOH$$

Wherein n ranges from 1 to 24, preferably from 2 to 18. Examples of aliphatic diacids that can be used in this invention include adipic acid, sebacic acid, azelaic acid, and 1,12-dodecanedioic acid. Example of the aromatic diacids include isophthalic acid and terephthalic acid.

The diamines have the following general structure:

$$H_2N(CH_2)_nNH_2$$

wherein n ranges from 1 to 10, preferably from 2 to 8. Examples of diamines include 1,4-tetramethylene diamine, 1,6-hexamethylene diamine, 1,8-octamethylene diamine and 1,5-pentamethylene diamine. The molar ratio between the primary or co-catalyst and the diamine preferably ranges from $3.1 \times 10^{-4}$ to $1.5 \times 10^{-1}$.

The present invention will be substantially illustrated in the following examples. It should be noted that these examples are intended only to aid the understanding of this invention; it should further be understood that the scope of this invention, which is intended to be determined by the appended claims, is by no means limited by these examples.

DESCRIPTION OF THE PREFERRED EMBODIMENTS

Example 1 (Preparation of Prepolymers)

The reactants comprised 146.14 g of adipic acid, 120 g of hexamethylene diamine, 49 g of water, and 0.276 g of sodium hypophosphite. After the reactants were charged into the reactor, nitrogen gas was introduced into the reactor several times to purge air from the reactor. Then the reactor was closed and the external temperature of the reactor was maintained at 250° C. for 1 hour. Subsequently, the external temperature of the reactor was raised to 270° C. for 1 hour. Thereafter, the temperature was raised to 320° C. During the temperature increase sequence, if the pressure inside the reactor exceeded 3 Kg/cm², the pressure would be released to 0 Kg/cm². Finally when the temperature inside the reactor reached 260° C., the reactor pressure was released to 0 Kg/cm², and the material was removed from the reactor. This completed the polymerization reaction. After the polymerization reaction, Nylon 66 prepolymer was produced which has a relative viscosity of 1.36. The relative viscosity assumed that the viscosity of concentrated sulfuric acid (more than 96%) is 1 g/dl in a Cannon Ubbelohde Size 200 (B194) capillary viscometer at 30° C.

Example 2 (Prior Art)

Prepare prepolymers which are synthesized according to the method described in Example 1. Add 0.3 g to 0.4 g of the Nylon 66 prepolymer into a stainless steel tube reactor. Seal the stainless steel tube reactor, and place the reactor into tin bath at 360° C. for 6 minutes.

The inner temperature of the reactor is approximately 260° C. The inner pressure of the reactor is approximately 73 cm Hg (76 cm Hg being absolute vacuum). Remove the reactor from tin bath and cool the reactor in the air for 1 minute. Then cool the reactor with water until the temperature of the reactor reached room temperature. Open the reactor to remove the sample. The product is a Nylon 66 polymer. Measure the relative viscosity of the sample. The relative viscosity of the polymer is 1.56.

Example 3 (This Invention)

Prepare the Nylon 66 prepolymer which is synthesized according to the method described in Example 1, and all the reaction conditions are the same as those in Example 2, except that 2 PHR (parts per hundred parts of reactants, by weight) of Bis (1,2,2,6,6-pentamethyl-4-piperidyl) sebacate (Commercial name Tinuvin 292, a hindered amine derivative) were added into the reactor. After the reaction is completed according to the method described in Example 2, the relative viscosity is measured. The product is a Nylon 66 polymer.

The relative viscosities of reaction products from Examples 1 through 3 are listed in Table 1. The relative viscosities of the Nylon 66 polymers that are synthesized using the amine compound as cocatalyst are higher than those without the cocatalyst, indicating a more complete reaction within the same reaction time by the addition of the amine cocatalyst disclosed in this invention.

TABLE 1

| Example No. | Polymer Composition | Relative Viscosity |
|---|---|---|
| 1 | Nylon 66 prepolymer | 1.36 |
| 2 | Nylon 66 polymer (w/o amine cocatalyst) | 1.56 |
| 3 | Nylon 66 polymer (with amine cocatalyst) | 1.83 |

Example 4 (Preparation of Prepolymer)

The reactants comprised 160 g of isophthalic acid, 120 g of hexamethylene diamine, 49 g of water, and 0.276 g of sodium hypophosphite. After the reactants were charged into the reactor, nitrogen gas was introduced into the reactor several times to purge air from the reactor. Then the reactor was closed and the external temperature of the reactor was maintained at 250° C. for 1 hour. Subsequently, the external temperature of the reactor was raised to 270° C. for 1 hour. Thereafter, the temperature was raised to 340° C. During the temperature increase sequence, if the pressure inside the reactor exceeded 3 Kg/cm², the pressure would be released to 0 Kg/cm². Finally when the temperature inside the reactor reached 270° C., the reactor pressure was released to 0 Kg/cm², and the material was removed from the reactor. This completed the polymerization reaction. After the polymerization reaction, Nylon 6I prepolymer was produced which has a relative viscosity of 1.96.

Example 5 (Prior Art)

Use Nylon 6I prepolymer from Example 4 instead of the Nylon 66 prepolymer in Example 2. All the other conditions are the same as those in Example 2. The relative viscosity of Nylon 6I polymer from this reaction is 4.0.

Example 6 (This Invention)

Use Nylon 6I prepolymer in Example 4 instead of Nylon 66 prepolymer in Example 2. The reactants are Nylon 6I prepolymer and 1 PHR of bis(1,2,2,6,6-pentamethyl-4-piperidyl) sebacate (Commercial name Tinuvin 292, a hindered amine derivative). All the other conditions are the same as those in Example 2. The relative viscosity of the Nylon 6I polymer prepared using the amine compound as cocatalyst is higher than that of the Nylon 6I polymer prepared without cocatalyst.

Table 2 compares the relative viscosities of Nylon 6I polymers from Examples 4 through 6.

TABLE 2

| Example No. | Polymer Composition | Relative Viscosity |
|---|---|---|
| 4 | Nylon 6I prepolymer | 1.96 |
| 5 | Nylon 6I polymer (w/o amine cocatalyst) | 4.00 |
| 6 | Nylon 6I polymer (with amine cocatalyst) | 4.26 |

Example 7 (Preparation of Prepolymer)

The reactants comprised 3650 g of adipic acid, 4150 g of terephthalic acid, 6000 g of hexamethylene diamine, 2450 g of distilled water, and 13.8 g of sodium hypophosphite. The diamine was first added to the distilled to make a mixture solution. After the reactants were charged into the reactor at room temperature, nitrogen gas was introduced into the reactor several times to purge air from the reactor. Then the reactor was closed and the external heat was applied to the reactor. After about 50–60 minutes, the external temperature of the reactor reached 240° C. and the internal temperature of the reactor was about 200° C. Subsequently, the external temperature of the reactor was maintained at 240°–250° C. for thirty minutes. At this time, the internal temperature of the reactor was about 200°–210° C. Thereafter, the external temperature of the reactor was raised to 250°–260° C. and the internal temperature increased to 210°–230° C. Finally when the temperature inside the reactor reached 230° C. (the external temperature was at 270° C.), the reactor pressure was released to 0 Kg/cm², and the material was removed from the reactor. At anytime during the reaction stage, the pressure would be released to 3 kg/cm² if the pressure exceeded 10 Kg/cm². This completed the polymerization reaction. After the polymerization reaction, Nylon 66T prepolymer was produced which has a relative viscosity of 1.13 g/dl.

Example 8 (Prior Art)

Prepare prepolymers according to the procedures described in Example 7. Add 0.3 g to 0.4 g of the Nylon 66T prepolymer into a stainsteel reactor. Seal the stainsteel reactor, and place the reactor into a tin bath at 385° C. for 20 minutes. The inner temperature of the reactor is approximately 320° C. The inner pressure of the reactor is approximately 30 cm Hg (76 cm Hg being absolute vacuum). Remove the reactor from the tin bath and cool the reactor in the air for 1 minute. Then cool the reactor with water until the temperature of the reactor reached room temperature. Open the reactor to remove the sample. The product is a Nylon 66T polymer. Measure the relative viscosity of the sample. The relative viscosity of the polymer is 2.75.

Example 9 (This Invention)

The prepolymer is synthesized according to the method described in Example 7, and all the reaction conditions are the same as those in Example 8, except that 0.5 PHR of various amine cocatalysts of this invention were added into the reactor. The compositions of the amine cocatalysts are shown in Table 3. After the reaction is completed according to the method described in Example 8, the relative viscosity is measured. The product is a Nylon 66T polymer.

The relative viscosities of reaction products from Examples 7 through 9 are listed in Table 4. The relative viscosities of the Nylon 66T polymers that are synthesized using the amine compound as cocatalyst are higher than those without a cocatalyst, indicating a more complete reaction within the same reaction time by the addition of the amine cocatalyst disclosed in this invention.

TABLE 3

| Example No. | Amine Composition |
|---|---|
| 9-A | N-phenyl-N'-(1,3-dimethylbutyl)-p-phenylene diamine (a phenylene diamine derivative) |
| 9-B | Bis(1,2,2,6,6-pentamethyl-4-piperidyl) sebacate (a hindered amine derivative) |
| 9-C | Poly(2,2,4-trimethyl-1,2-dihydroquinoline) (a poly(hindered amine) derivative) |

TABLE 4

| Example No. | Polymer Composition | Relative Viscosity |
|---|---|---|
| 7 | Nylon 66T prepolymer | 1.13 |
| 8 | Nylon 66T polymer (w/o amine cocatalyst) | 2.75 |
| 9-A | Nylon 66T polymer (with amine cocatalyst) | 3.03 |
| 9-B | Nylon 66T polymer (with amine cocatalyst) | 4.50 |
| 9-C | Nylon 66T polymer (with amine cocatalyst) | 3.22 |

Example 10 (Prior Art)

Prepare prepolymers according to the procedures described in Example 7. Add 0.3 g to 0.4 g of Nylon 66T prepolymer into a stainsteel reactor. Seal the stainless steel tube reactor, and place the reactor into a tin bath at 380° C. for 12 minutes. The inner temperature of the reactor was approximately 312° C. The inner pressure of the reactor is approximately 30 cm Hg (76 cm Hg being absolute vacuum). Remove the reactor from the tin bath and cool the reactor in the air for 1 minute. Then cool the reactor with water until the temperature of the reactor reached room temperature. Open the reactor to remove the sample. The product is a Nylon 66T polymer. Measure the relative viscosity of the sample. The relative viscosity of the polymer is 1.67.

Example 11 (This Invention)

The prepolymer is synthesized according to the method described in Example 7, and the other reaction conditions are the same as those in Example 10, except that 0.5 PHR of various types of amine cocatalysts were added into the reactor. The compositions of the amine cocatalysts are shown in Table 5. After the reaction is completed according to the method described in Example 10, the relative viscosity is measured. The product is a Nylon 66T polymer.

The relative viscosities of reaction products from Examples 7, 10 and 11 are listed in Table 6. The relative viscosities of the Nylon 66T polymers that are synthesized using the amine compound as cocatalyst are higher than those without a cocatalyst, indicating a more complete reaction within the same reaction time by the addition of the amine cocatalyst disclosed in this invention.

TABLE 5

| Example No. | Amine Composition |
|---|---|
| 11-A | Bis(2,2,6,6-tetramethyl-4-piperidyl) sebacate (a hindered amine derivative) |
| 11-B | 2-[2-hydroxyl-3,5-di-(1,1-dimethyl-benzyl)phenyl]-2H-benzotriazole (Benzotriazole group II) |

TABLE 6

| Example No. | Polymer Composition | Relative Viscosity |
|---|---|---|
| 7 | Nylon 66T prepolymer | 1.13 |
| 10 | Nylon 66T polymer (w/o amine cocatalyst) | 1.67 |
| 11-A | Nylon 66T polymer (with amine cocatalyst) | 2.39 |
| 11-B | Nylon 66T polymer (with amine cocatalyst) | 3.11 |

Example 12 (Preparation of Prepolymers)

The reactants comprised 120 g of hexamethylene diamine, 116.2 g of isophthalic acid, 49.8 g of terephthalic acid, 49 g of water, and 0.276 g of sodium hypophosphite. After the reactants were charged into the reactor, nitrogen gas was introduced into the reactor several times to purge air from the reactor. Then the reactor was closed and the external temperature of the reactor was maintained at 250° C. for 40 minutes. Subsequently, the external temperature of the reactor was raised to 270° C. for 40 minutes. Thereafter, the temperature was raised to 340° C. During the temperature increase sequence, if the pressure inside the reactor exceeded 3 Kg/cm$^2$, the pressure would be released to 0 Kg/cm$^2$. Finally when the temperature inside the reactor reached 290° C., the reactor pressure was released to 0 Kg/cm$^2$, and the material was removed from the reactor. This completed the polymerization reaction. After the polymerization reaction, Nylon 6IT prepolymer was produced which has a relative viscosity of 2.04.

Example 13 (Prior Art)

Prepare prepolymers which are synthesized according to the method described in Example 12. Add 0.3 g to 0.4 g of the Nylon 6IT prepolymer into a stainless steel tube reactor. Seal the stainless steel tube reactor, and place the reactor into tin bath at 360° C. for 6 minutes. The inner temperature of the reactor was approximately 260° C. The inner pressure of the reactor is approximately 73 cm Hg (76 cm Hg being absolute vacuum). Remove the reactor from tin bath and cool the reactor in the air for 1 minute. Then cool the reactor with water until the temperature of the reactor reached room temperature. Open the reactor to remove the sample. The product is a Nylon 6IT polymer. Measure the relative viscosity of the sample. The relative viscosity of the polymer is 2.58 g/dl.

Example 14 (This Invention)

Use Nylon 6IT prepolymer in Example 12. The reactants are Nylon 6IT prepolymer and 2 PHR of 2-[2-hydroxyl-3,5-di-(1,1-dimethyl-benzyl)phenyl]-2H-benzotriazole (commercial name Tinuvin 900, a group II benzotriazole). All the other conditions are the same as those in Example 13. The relative viscosity of Nylon 6IT polymer synthesized with the amine cocatalyst is higher than those of Nylon 6IT polymer without the amine cocatalyst. The comparison is shown in Table 7.

TABLE 7

| Example No. | Polymer Composition | Relative Viscosity |
|---|---|---|
| 12 | Nylon 6IT prepolymer | 2.04 |
| 13 | Nylon 6IT polymer (w/o amine cocatalyst) | 2.58 |
| 14 | Nylon 6IT polymer (with amine cocatalyst) | 2.72 |

Example 15 (Preparation of Prepolymers)

The reactants comprised 120 g of hexamethylene diamine, 73 g of adipic acid, 40 g of isophthalic acid, 43 g of terephthalic acid, 49 g of distilled water, and 0.276 g of sodium hypophosphite. After the reactants were charged into the reactor, nitrogen gas was introduced into the reactor several times to purge air from the reactor. Then the reactor was closed and the external temperature of the reactor was maintained at 250° C. for one hour. Subsequently, the external temperature of the reactor was raised to 270° C. for one hour. Thereafter, the temperature was raised to 340° C. During the temperature increase sequence, if the pressure inside the reactor exceeded 3 Kg/cm$^2$, the pressure was released to 0 Kg/cm$^2$. Finally when the temperature inside the reactor reached 275° C., the reactor pressure was released to 0 Kg/cm$^2$, and the material was removed from the reactor. This completed the polymerization reaction. After the polymerization reaction, Nylon 66IT prepolymer was produced which has a relative viscosity of 2.26.

Example 16 (Prior Art)

Prepare prepolymers which are synthesized according to the method described in Example 15. Add 0.3 g to 0.4 g of the Nylon 66IT prepolymer into a stainless steel tube reactor. Seal the stainless steel tube reactor, and place the reactor into tin bath at 360° C. for 8 minutes. The inner temperature of the reactor is approximately 285° C. The inner pressure of the reactor is approximately 72 cm Hg (76 cm Hg being absolute vacuum). Remove the reactor from tin bath and cool the reactor in the air for 1 minute. Then cool the reactor with water until the temperature of the reactor reached room temperature. Open the reactor to remove the sample. The product is a Nylon 66IT polymer. Measure the relative viscosity of the sample. The relative viscosity of the polymer is 5.96 g/dl.

Example 17 (This Invention)

The reactants are Nylon 66IT prepolymer and 1 PHR of 2-[2-hydroxyl-3,5-di-(1,1-dimethyl-benzyl)phenyl]-2H-benzotriazole (commercial name Tinuvin 900, a group II benzotriazole). All the other conditions are the same as those in Example 16. The relative viscosity of Nylon 66IT polymer synthesized using the amine compound as a cocatalyst is higher than those of Nylon 66IT polymer without the amine cocatalyst. The comparison is shown in Table 8.

TABLE 8

| Example No. | Polymer Composition | Relative Viscosity |
|---|---|---|
| 15 | Nylon 66IT prepolymer | 2.26 |

TABLE 8-continued

| Example No. | Polymer Composition | Relative Viscosity |
|---|---|---|
| 16 | Nylon 66IT polymer (w/o amine cocatalyst) | 5.96 |
| 17 | Nylon 66IT polymer (with amine cocatalyst) | 6.90 |

EXAMPLE 18 (Prior Art)

Grind the Nylon 66T prepolymer from Example 7 into powders, and feed the powder into a twin screw extruder (W & P ZSK 30 model, with a diameter of 30 mm and an L/D of 27). Then extrude the reactants. The conditions of extrusion are described in the following paragraph.

The reaction temperatures are 280° C. in the first stage, 320° C. in the second stage, 340° C. in the third stage, 340° C. in the fourth stage, and 340° C. in the fifth stage. The temperature of the die is 340° C. The pressure of the fourth stage is 30 cm Hg. The rotation speed of the screw is 100 rpm, representing an average resident time of about two minutes.

EXAMPLE 19 (This Invention)

The reactants are Nylon 66T prepolymer and 0.3 PHR of amine cocatalyst (their compositions are shown in Table 9). All the other conditions are the same as in Example 18. Their relative viscosities are shown in Table 10.

TABLE 9

| Example No. | Amine Composition |
|---|---|
| 19-A | Bis(2,2,6,6-tetramethyl-4-piperidyl) sebacate (a hindered amine derivative) |
| 19-B | Poly(2,2,4-trimethyl-1,2-dihydroquinoline) (Poly(hindered amine) derivative) |

TABLE 10

| Example No. | Polymer Composition | Relative Viscosity |
|---|---|---|
| 7 | Nylon 66T prepolymer | 1.13 |
| 18 | Nylon 66T polymer (w/o amine cocatalyst) | 2.77 |
| 19-A | Nylon 66T polymer (with amine cocatalyst) | 3.81 |
| 19-B | Nylon 66T polymer (with amine cocatalyst) | 2.82 |

From all the tables shown above, it is evident that the addition of amine cocatalyst, in the presence of a primary catalyst, increases the reaction rate to produce polyamide and/or copolyamide.

What is claimed is:

1. A catalyst composition for the preparation of polyamide and copolyamide from reactants which comprise at least one diamine and at least one diacid, said catalyst composition comprising:
   (a) a primary catalyst selected from the group consisting of alkali metal hypophosphites and alkaline earth metal hypophosphites; and
   (b) a cocatalyst selected from the group consisting of phenylene diamines, hindered amines, poly(hindered amines), Group I benzotriazoles, and Group II benzotriazoles, wherein said hindered amines are represented by the following formula:

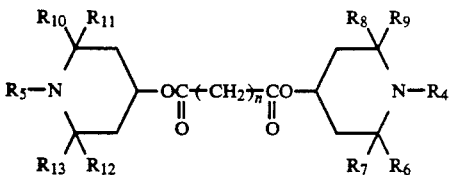

and wherein n is an integer from 1 to 18, and $R_4$ through $R_{13}$ are, independently, selected from the group consisting of hydrogen and aliphatic radicals containing 1 to 10 carbons.

2. The catalyst composition of claim 1 wherein the molar ratio between said primary catalyst and said diamine ranges from $3.1 \times 10^{-4}$ to $1.5 \times 10^{-1}$.

3. The catalyst composition of claim 1 wherein the molar ratio between said cocatalyst and said diamine ranges from $3.1 \times 10^{-4}$ to $1.5 \times 10^{-1}$.

4. The catalyst composition of claim 1 wherein said alkali metal hypophosphite is sodium hypophosphite.

5. The catalyst composition of claim 1 wherein said phenylene diamines are represented by the following formula:

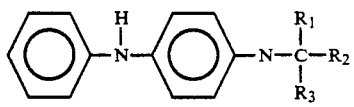

wherein $R_1$, $R_2$, and $R_3$ are, independently, selected from the group consisting of hydrogen and aliphatic radicals containing 1 to 10 carbons.

6. The catalyst composition of claim 5 wherein $R_1$, $R_2$, and $R_3$ are, independently, selected from the group consisting of hydrogen and aliphatic radicals containing 1 to 6 carbons.

7. The catalyst composition of claim 1 wherein said hindered amines are represented by the following formula:

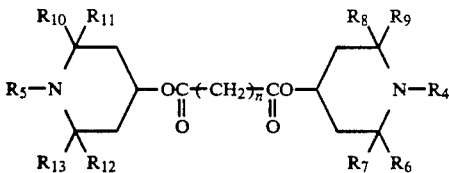

wherein n is an integer from 1 to 10 and $R_4$ through $R_{13}$ are, independently, selected from the group consisting of hydrogen and aliphatic radicals containing 1 to 10 carbons.

8. The catalyst composition of claim 7 wherein n is an integer from 2 to 10.

9. The catalyst composition of claim 7 wherein $R_4$ through $R_{13}$ are, independently, selected from the group consisting of hydrogen and aliphatic radicals containing 1 to 6 carbons.

10. The catalyst composition of claim 1 wherein said poly(hindered amines) are represented by the following formula:

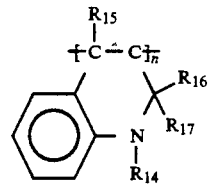

wherein $R_{14}$ through $R_{17}$ are, independently, selected from the group consisting of hydrogen and aliphatic radicals containing 1 to 10 carbons.

11. The catalyst composition of claim 10 wherein $R_{14}$ through $R_{17}$, are, independently, selected from the group consisting of hydrogen and aliphatic radicals containing 1 to 6 carbons.

12. The catalyst composition of claim 1 wherein said Group I benzotriazoles are represented by the following formula:

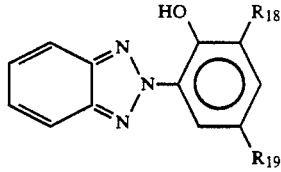

wherein $R_{18}$ through $R_{19}$ are, independently, selected from the group consisting of hydrogen and aliphatic radicals containing 1 to 10 carbons.

13. The catalyst composition of claim 11 wherein $R_{18}$ through $R_{19}$, are, independently, selected from the group consisting of hydrogen and aliphatic radicals containing 1 to 6 carbons.

14. The catalyst composition of claim 1 wherein said Group II benzotriazoles are represented by the following formula:

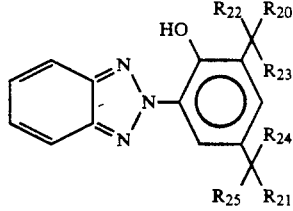

wherein $R_{20}$ and $R_{21}$ are, independently, selected from the group consisting of benzene, naphthalene and derivatives thereof; $R_{22}$ through $R_{25}$ are, independently, selected from the group consisting of hydrogen and aliphatic radicals containing 1 to 10 carbons.

* * * * *